United States Patent [19]

Shibata et al.

[11] Patent Number: 5,112,002
[45] Date of Patent: May 12, 1992

[54] AUTOMATIC WINDING MECHANISM FOR A CONTINUOUS SHEET AND THE LIKE

[75] Inventors: Eiji Shibata; Mototsugu Ono, both of Nagoya, Japan

[73] Assignee: Brother Kogyo Kabushiki Kaisha, Nagoya, Japan

[21] Appl. No.: 737,468

[22] Filed: Jul. 30, 1991

Related U.S. Application Data

[62] Division of Ser. No. 471,633, Jan. 29, 1990.

[30] Foreign Application Priority Data

Jan. 30, 1989 [JP] Japan .................. 1-20401
Jan. 31, 1989 [JP] Japan .................. 1-10581
Jan. 31, 1989 [JP] Japan .................. 1-11259

[51] Int. Cl.⁵ .................. B65H 18/10
[52] U.S. Cl. .................. 242/57; 242/67.2; 242/195
[58] Field of Search ............ 242/57, 67.1 R, 67.2, 242/DIG. 3, 195; 355/27, 64, 50, 72; 226/91

[56] References Cited

U.S. PATENT DOCUMENTS

| | | |
|---|---|---|
| 1,861,374 | 5/1932 | Wood .................. 242/67.2 |
| 3,788,572 | 1/1974 | Wroblewski .................. 242/195 X |
| 3,827,647 | 8/1974 | Jones et al. .................. 242/67.1 R X |
| 4,483,492 | 11/1984 | Tokuda et al. .................. 242/57 |
| 4,504,026 | 3/1985 | Serizawa et al. .................. 242/67.1 R X |
| 4,544,110 | 10/1985 | Nagel et al. .................. 242/67.1 R |
| 4,688,737 | 8/1987 | Kogane et al. .................. 242/69.1 R |
| 4,784,345 | 11/1988 | Romanowski et al. .................. 242/DIG. 3 X |
| 4,817,886 | 4/1989 | Yoshioka et al. .................. 242/195 X |
| 4,832,284 | 5/1989 | Inoue .................. 242/195 |
| 4,838,497 | 6/1989 | Kramer et al. .................. 242/67.2 |

FOREIGN PATENT DOCUMENTS

| | | | |
|---|---|---|---|
| 58-63645 | 4/1983 | Japan .................. | 252/57 |
| 59-227652 | 12/1984 | Japan .................. | 242/55 |
| 60-56761 | 4/1985 | Japan .................. | 242/57 |
| 2104876 | 3/1983 | United Kingdom .................. | 242/57 |

Primary Examiner—Daniel P. Stodola
Assistant Examiner—John P. Darling
Attorney, Agent, or Firm—Oliff & Berridge

[57] ABSTRACT

An automatic winding mechanism which includes a rotatable winding shaft, a first guide including a circular first guide portion and a second guide including a substantially U-shaped second guide portion is disclosed. A leader portion of a continuous sheet fed by a pair of feed rollers is introduced along a circumferential surface of the winding shaft by the first and second guide portions which are disposed so as to enclose the winding shaft in cooperation with each other. The continuous sheet is then automatically wound on the winding shaft since the circumferential velocity of the winding shaft is set higher than the feeding speed of the feed rollers. The winding mechanism also includes a first sensor for sensing whether the winding shaft is in place. The winding mechanism is started if the winding shaft is sensed and the winding mechanism is prevented from starting if the winding shaft is not sensed. A second sensor for sensing that a leader portion of the continuous sheet is disposed between the feed rollers and the winding shaft is also provided. When the second sensor is provided, tapered flanges are formed on both ends of the winding shaft and are tapered toward its center. A nip of the sheet by the feed rollers is cancelled by a nip cancelling mechanism when a leader portion of the continuous sheet is sensed by the second sensor. As a result, the leader portion is permitted to move freely to a proper centered position on the winding shaft.

13 Claims, 7 Drawing Sheets

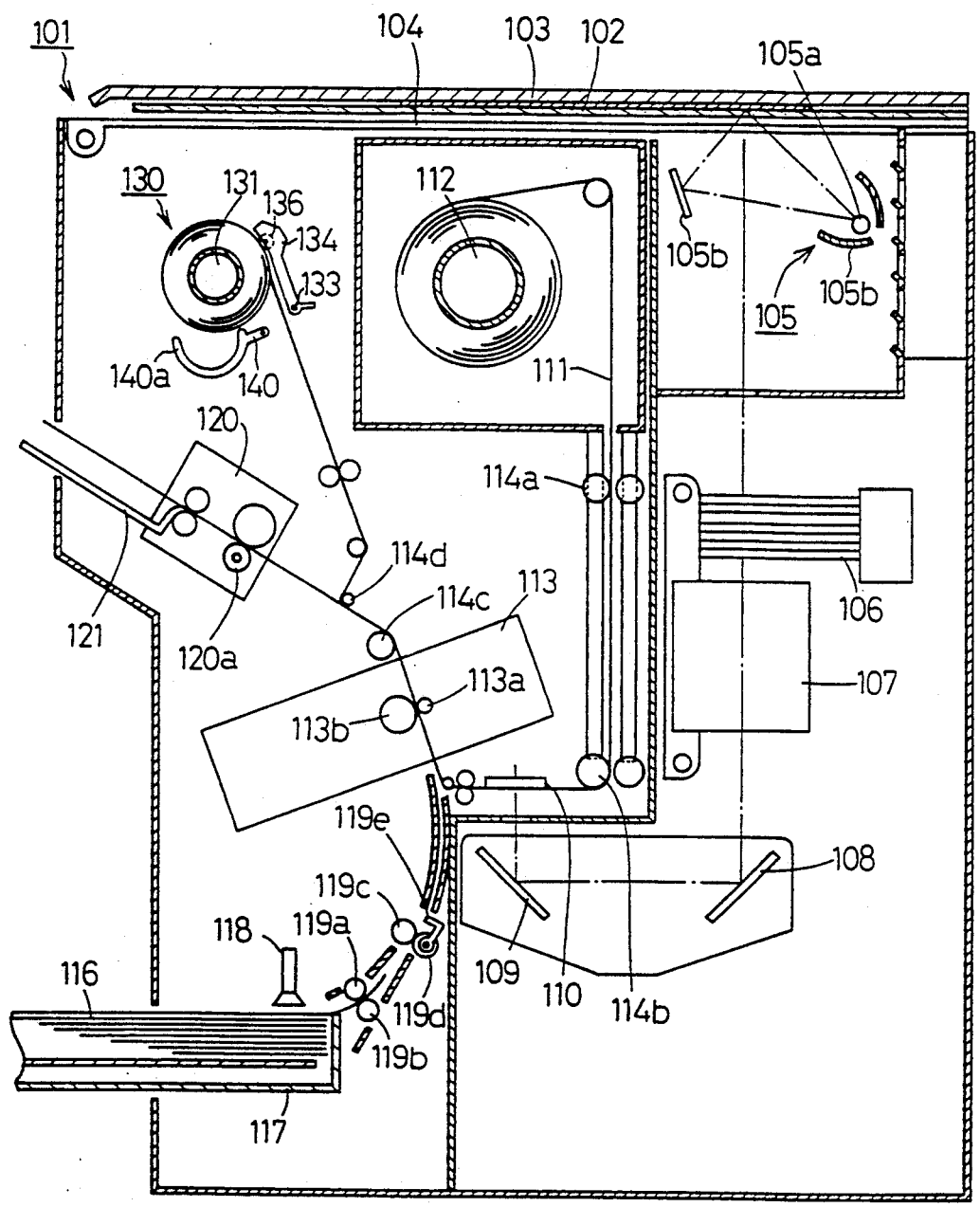

AUTOMATIC WINDING MECHANISM FOR A CONTINUOUS SHEET AND THE LIKE

This is a division of application Ser. No. 07/471,633 filed Jan. 29, 1990.

BACKGROUND OF THE INVENTION

1. Field of the Invention

This invention relates to an automatic winding mechanism for automatically winding an end of a continuous recording sheet or film around a take-up shaft, for example, in an image forming device, and more particularly to an automatic winding mechanism for a continuous sheet and the like which confirms the presence or absence of a take-up shaft prior to threading of paper to prevent possible failure of an automatic paper threading operation and also to an automatic winding mechanism wherein a continuous sheet can be centered readily with respect to a take-up shaft upon automatic threading of paper.

2. Description of Related Art

A recording sheet or the like for use with an image forming device as disclosed in U.S. Pat. No. 4,806,982, U.S. Pat. No. 4,827,356 or U.S. Pat. No. 4,847,661 is normally provided in the form of a wound roll in a cartridge. Accordingly, when a cartridge is exchanged for a new cartridge, it is necessary to feed a leader portion of a recording sheet drawn out from the new cartridge to a take-up shaft by means of a sheet feeding roller or the like and then to wind the leader portion of the recording sheet around the take-up shaft. Upon such winding, in order for the recording sheet to be automatically wound around the take-up shaft, it is necessary to guide an end of the sheet forwarded to a position near the take-up shaft by a guide means so that the end of the sheet may be properly wound around the take-up shaft.

Conventionally, such guide means is formed either from part of a housing of the image forming device or from four guide members disposed in such a manner as to surround the take-up shaft on all sides, each guide member being mounted for movement in a radial direction to the take-up shaft.

With the type of guide means which is formed from part of a housing, however, since a portion of the housing proximate the take-up shaft is formed as the guide means, there is a limitation in the length (as well as the thickness) of a recording sheet that can be wound around the take-up shaft, therefore when the recording sheet is comparatively long, the guide means cannot be utilized. Additionally, the sheet may not be guided well by this type of guide means, raising the possibility that the sheet may not be wound around the take-up shaft. On the other hand, the guide means which has four guide members is complicated in structure, and since it requires a considerably large amount of space for disposition thereof around the take-up shaft, it cannot be installed where a sufficiently large amount of space cannot be assured.

In addition to the structure described above, a continuous sheet winding device commonly includes a rockable holding arm which is normally urged toward a removable take-up shaft which is rotated to wind a continuous sheet thereon. A roller is supported for rotation in the holding arm for contacting with and pressing against the take-up shaft. Thus, the take-up shaft is rotated to wind a continuous sheet thereon while applying a pressing force against the continuous sheet having a leader portion or the like wound around the take-up shaft by way of the roller supported for rotation on the holding arm.

The conventional continuous sheet winding device, however, commonly includes no means for determining the presence or absence of a take-up shaft. Consequently, even if an operator forgets, for example, the step of loading of the take-up shaft, an automatic paper threading operation is attempted to be performed, but is unsuccessful and therefore must be performed again.

Furthermore, a continuous sheet winding device of the above-described type commonly includes no means for centering a continuous sheet with respect to a take-up shaft upon automatic paper threading. Consequently, if a leader portion of a continuous sheet is transported in a laterally displaced condition by rotation of a transport roller or the like upon automatic paper threading, winding by a take-up shaft will be started in such a condition. This results in the problem that a side edge of the continuous sheet may collide with one of a pair of take-up flanges mounted at the opposite end portions of the take-up shaft and hinder the continuous sheet from being wound properly.

SUMMARY OF THE INVENTION

Accordingly, it is an object of the present invention to provide an automatic winding mechanism for a continuous sheet and the like which is simple in structure, requires a small installation space and enables a sheet or the like to be wound with certainty around a take-up shaft.

It is another object of the present invention to provide an automatic winding mechanism for a continuous sheet and the like wherein the presence or absence of a take-up shaft is detected with certainty, having a comparatively simple construction at a low cost and enabling an automatic paper threading operation to be performed only when a take-up shaft is loaded in position.

It is a further object of the present invention to provide an automatic winding mechanism for a continuous sheet and the like wherein centering of a continuous sheet with respect to a take-up shaft can be performed with certainty having a comparatively simple construction at a low cost to allow stabilized winding of the continuous sheet.

In order to attain these objects, according to one aspect of the present invention, there is provided an automatic winding mechanism for a continuous sheet and the like, which comprises means for receiving a take-up shaft, and a pair of guide arms disposed on the opposite sides of a continuous sheet which is to be introduced to a circumferential face of the take-up shaft along an extension of a line tangential to the circumferential face of the take-up shaft, the guide arms extending at first ends thereof toward the take-up shaft, a first one of the guide arms having at a first end portion thereof a guide portion of an arcuate shape in side elevation for contacting the continuous sheet with the circumferential face of the take-up shaft, a second one of the guide arms having a guide portion of a substantially U-shape in side elevation formed contiguously at an acute angle at the first end portion thereof such that the guide portion is opposed to and cooperates with the arcuate guide portion of the first guide arm to surround the take-up shaft, at least the second guide arm being supported at a second, or base, end thereof for pivotal motion such that the substantially U-shaped guide portion thereof may be moved away from the take-up shaft. The second guide arm is disposed such that the center of the substantially U-shaped guide portion thereof is displaced from the center of the take-up shaft.

With the above-described automatic winding mechanism, a leading end of a sheet to be advanced to the take-up shaft is fed to the take-up shaft under the guidance of the opposing guide arms. The end of the sheet thus fed then moves along the circumferential face of the take-up shaft while being pressed against the circumferential face by the arcuate guide portion of the first guide arm, and is then guided by the substantially U-shaped guide portion of the second guide arm until it moves fully around the take-up shaft and is abutted at an acute angle with a succeeding portion of the sheet being advanced toward the take-up shaft. The end of the sheet is then fed to the take-up shaft again and wound around the take-up shaft. After the sheet is wound around the take-up shaft in this manner, at least the second guide arm having the substantially U-shaped guide portion thereon is pivoted to move the substantially U-shaped guide portion thereof away from the sheet and the take-up shaft. When the center of the substantially U-shaped guide portion of the second guide arm is displaced from the center of the take-up shaft, even if the size of the guide portion is reduced to some degree, possible interference between the guide portion and the take-up shaft can be prevented.

According to another aspect of the present invention, there is provided a continuous paper winding device wherein a rockable holding arm is normally biased toward a take-up shaft, which take-up shaft is removably loaded in position in the continuous paper winding device and adapted to be rotated to wind a continuous sheet thereon, and a roller for contacting with and pressing against the take-up shaft is supported for rotation on the holding arm, the roller being held on the holding arm for reciprocating movement in a radial direction of the take-up shaft, a sensor being disposed rearwardly of the roller for outputting an on-signal when the roller is moved away from the take-up shaft. With the above-described continuous paper winding device, only when a removable take-up shaft is loaded in position, can the roller for contacting with and pressing against the take-up shaft be moved back to cause the sensor disposed rearwardly of the roller to output an on-signal. Consequently, the presence or absence of a take-up shaft can be readily detected with certainty.

According to a further aspect of the present invention, there is provided a continuous paper winding device which comprises a take-up shaft disposed at a terminal end of a transport passage of a continuous sheet, said take-up shaft being adapted to be rotated to wind the continuous paper thereon, a pair of disk-shaped winding flanges mounted at the opposite end portions of the take-up shaft, each winding flange having an inner end face tapered inwardly toward the axis of the take-up shaft, a pair of transport rollers disposed on an upstream side with respect to the take-up shaft along the transport passage for contacting under pressure with and holding the continuous paper therebetween to transport the continuous paper toward the take-up shaft, and a nip cancelling mechanism for detecting an instant at which the continuous sheet reaches the take-up shaft and for temporarily cancelling, at the instant, a nip of the continuous sheet by the transport rollers. With the above-described continuous paper winding device, at the instant at which the leading end of a continuous sheet transported from the upstream side upon automatic paper threading reaches the take-up shaft, a nip of the continuous sheet by the transport rollers is cancelled to allow lateral movement of the continuous sheet. Thus, if there is some lateral displacement in the leading end of the continuous sheet, a side edge thereof is contacted with and pushed by the inner end tapered face of one of the winding flanges toward which the leading end of the continuous sheet is displaced. Consequently, the leading end of the continuous sheet is moved back to the center of the take-up shaft along the inner end tapered face of the winding flange due to the rigidity of the continuous paper on the transport passage and thus restricted to its proper position. Consequently, centering of the continuous sheet with respect to the take-up shaft can be readily achieved with certainty.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a side elevational sectional view of a color copying machine in which an automatic winding mechanism according to the present invention is incorporated.

DETAILED DESCRIPTION OF THE PREFERRED EMBODIMENTS

Figure 1:
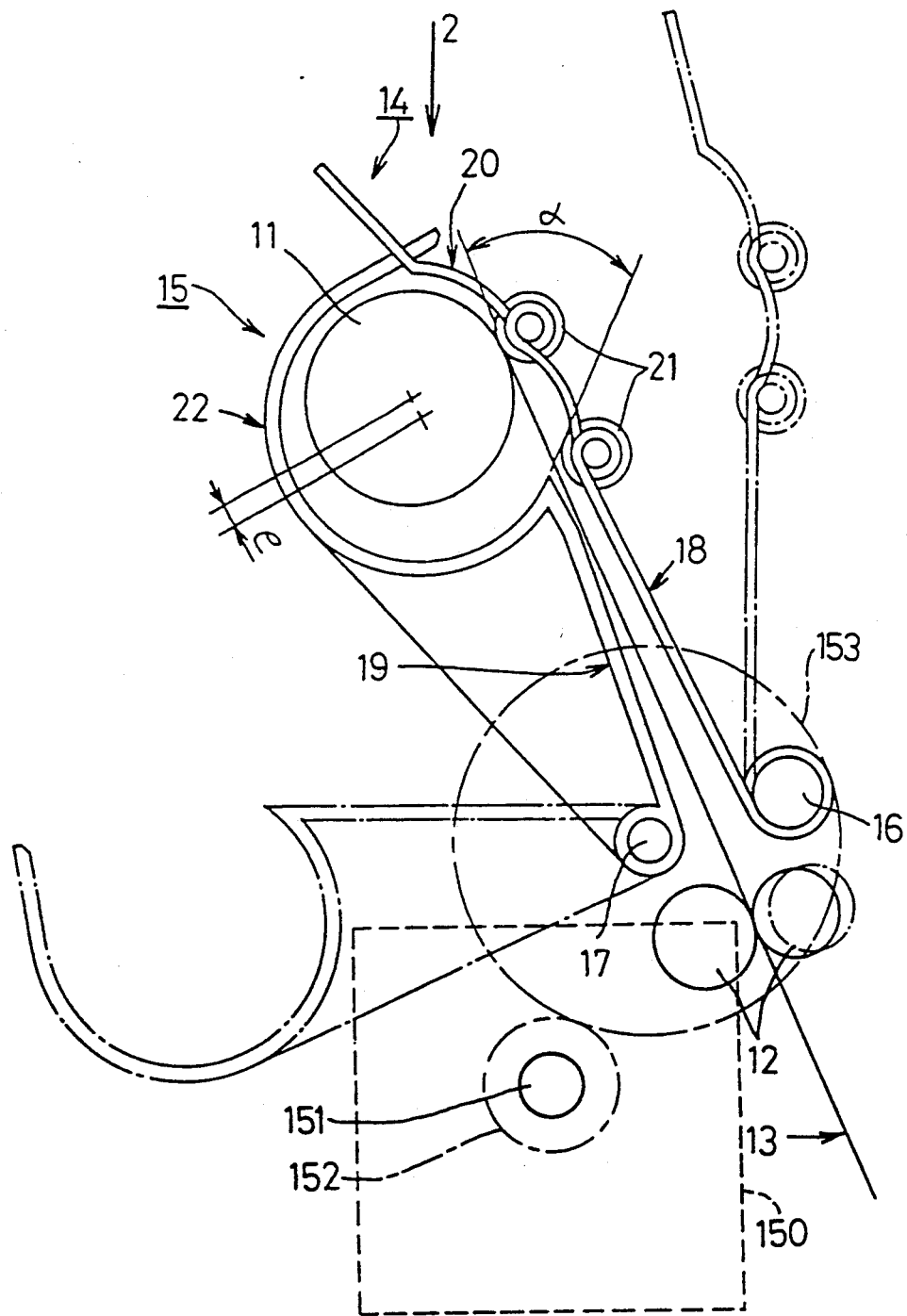
FIG. 1 is a side elevational sectional view of an automatic winding mechanism according to a first embodiment of the present invention.
Figure 2:
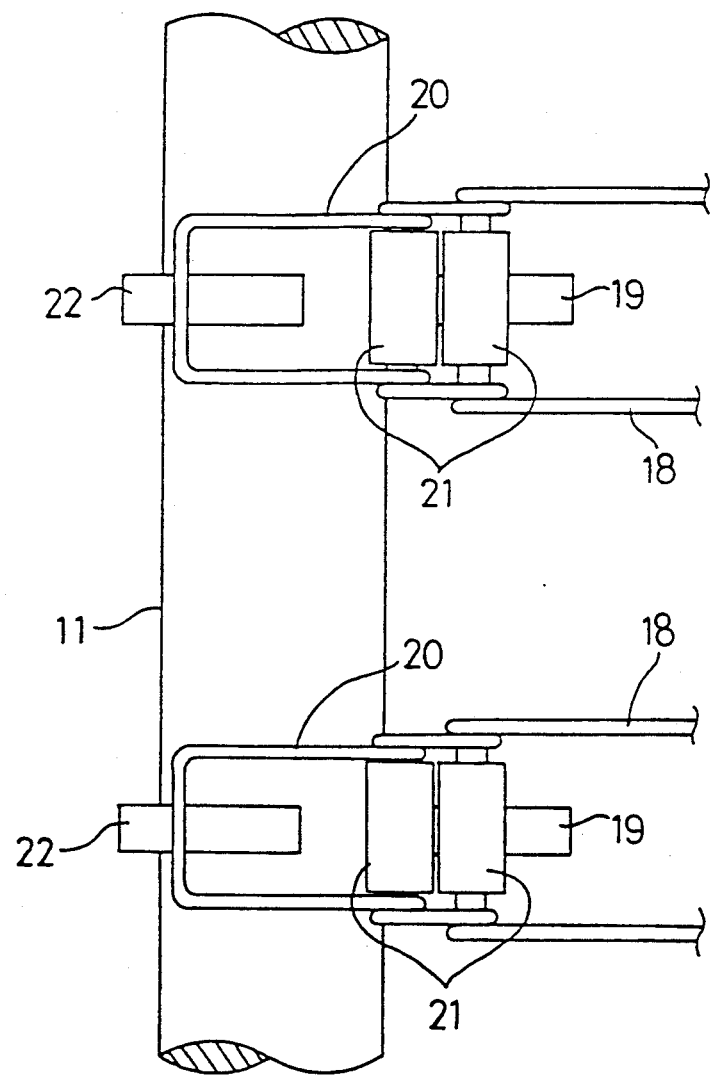
FIG. 2 is a plan view of the automatic winding mechanism of FIG. 1 as viewed in the direction indicated by the arrow mark in FIG. 1.

Referring first to FIGS. 1 and 2, there is shown an automatic winding mechanism for a continuous sheet and the like according to a first preferred embodiment of the present invention. The automatic winding mechanism includes a pair of sheet feed rollers 12 disposed for rotation on the opposite sides of an extension of a line tangential to a peripheral or circumferential surface of a take-up shaft 11. Take-up shaft 11 acts as a winding shaft. Two pairs of guide members 14 and 15 are disposed on the opposite sides of a continuous sheet 13 which is fed to the take-up shaft 11 by the feed rollers 12. Each of the pairs of guide members 14 and 15 includes a straight guide arm 18 or 19 having a base end supported for pivotal motion around a support shaft 16 or 17, respectively, adjacent the feed rollers 12 and extending toward the take-up shaft 11.

A guide portion 20 having a circular or arcuate shape in side elevation is formed in an integrated relationship at an end of the guide arm 18 for contacting with the circumferential face of the take-up shaft 11. A pair of rollers 21 are supported for rotation on guide member 14, one at an intermediate location of the guide portion 20 and another at a location of the guide portion 20 adjacent to where it is connected to the guide arm 18. The guide member 14 is normally biased to move in the counter-clockwise direction in FIG. 1 by means of a spring (not shown) such that the guide portion 20 is pressed against the take-up shaft 11.

A guide portion 22 having a substantially U-shape in side elevation is connected to an end of the guide arm 19 of the other guide member 15 at an end thereof so as to be contiguous with and connected at an acute angle to the guide arm 19. Guide portion 22 is arranged such that it is opposed to and combines with the arcuate guide portion 20 of the guide member 14 to surround the take-up shaft 11. The guide portion 22 is thus supported for pivotal movement toward and away from the take-up shaft 11 around the support shaft 17 at the base end of the guide arm 19. The guide arm 19 of the guide member 15 is connected to be driven to pivot by a drive motor 150 by way of the support shaft 17. The drive motor 150 has a drive axis 151 on which a drive gear 152 is fixed. Drive gear 152 meshes with a driven gear 153 fixed on the support shaft 17. Thus, the guide member 15 is rockably pivoted by forward and backward rotation of the drive motor 150 through the gears 152, 153.

In the automatic winding mechanism of the present embodiment, the center of the guide portion 22 of the guide member 15 is displaced by a distance e toward the feed rollers 12 from the center of the take-up shaft 11 as seen in FIG. 1. This displacement is intended to prevent the guide portion 22 of the guide member 15 from interfering with the take-up shaft 11 by forming the diameter of an inner peripheral guide face of the guide portion 22 slightly greater than the outer diameter of the take-up shaft 11. It is to be noted that upon winding of the sheet 13, the take-up shaft 11 is rotated in the counter-clockwise direction in FIG. 1 by another motor (not shown). It is also to be noted that while a pair of narrow guide portions 20 and 22 are provided in a predetermined spaced relationship in the axial direction of the take-up shaft 11 as seen in FIG. 2 in the automatic winding mechanism of the embodiment described above, they may otherwise be replaced by a single pair of guide portions 20 and 22 which are widened in the axial direction of the take-up shaft 11.

In operation, referring to FIG. 1, the sheet 13 is fed toward the take-up shaft 11 by the feed rollers 12. Thereupon, a leading end of the sheet 13 is guided by the opposing guide arms 18 and 19 until it is fed to the take-up shaft 11. After the leading end of the sheet 13 reaches the take-up shaft 11, it is guided to the guide portions 20 while being pressed against the circumferential face of the take-up shaft 11 by the rollers 21 of the arcuate guide portions 20 of the guide members 14, and is thus fed along the circumferential face of the take-up shaft 11. The sheet 13 is then guided by the substantially U-shaped guide portions 22 of the guide members 15 until it extends substantially over the entire periphery of the take-up shaft 11 and comes into abutment at an acute angle a with a succeeding portion of the sheet 13 being advanced toward the take-up shaft 11. The leading end of the sheet 13 is then fed to the take-up shaft 11 along the succeeding portion of the sheet 13 until it is wound around the take-up shaft 11. The sheet 13 is wound by several turns around the take-up shaft 11 in this manner. Since the circumferential speed of the take-up shaft 11 is higher than the speed at which the sheet 13 is fed by the feed rollers 12, the sheet 13 is tightened around the take-up shaft 11. After completion of the winding operation, the guide arms 19 on the side of the substantially U-shaped guide portions 22 are pivoted in the counter-clockwise direction in FIG. 1 by the drive motor 150 so that they are spaced away from the sheet 13 and the take-up shaft 11.

Referring now to FIGS. 3A to 5, there is shown an automatic winding mechanism according to a second preferred embodiment of the present invention. The winding mechanism 30 is located at a terminal end of a transport route of a continuous sheet 13 and is constructed to receive a removable take-up shaft 31 for rotation thereon. A pair of winding flanges 32 are mounted at the opposite end portions of the take-up shaft 31 for properly arranging the opposite side portions of the continuous sheet 13 wound on the take-up shaft 31. Alongside the transport route of the continuous sheet 13, a pair of holding arms 34 are supported at lower ends thereof for pivotal motion by means of pivot shaft 33 and are normally urged toward the take-up shaft 31 by torsion spring 35. Each of the holding arms 34 has an elongated hole 34a formed therein which extends in a radial direction from the take-up shaft 31. A support shaft 37, which extends in opposite directions from the opposite ends of a roller 36, is fitted at opposite end portions thereof in the elongated holes 34a of each of the holding arms 34. Consequently, a roller 36 is supported for rotation and also for retracting movement in a radial direction from the take-up shaft 31 on each of the holding arms 34. The roller 36 is provided to contact with and press against the take-up shaft 31 under the resilient force of the torsion spring 35. A sensor 38, such as a microswitch, is disposed rearwardly of the roller 36 such that it may press the roller 36 forwardly with a resilient force of an actuator 38a thereof. When the roller 6 is retracted, the sensor 38 outputs an on-signal by way of the actuator 38a. Sensor 38 can be provided on one or both of the holding arms 34.

Thus, when the take-up shaft 31 is loaded in position, the roller 36 is contacted by the take-up shaft 31 so that the holding arms 34 are rocked slightly away from the take-up shaft 31 against the resilient force of the torsion spring 35. At the same time roller 36 is retracted against the resilient force of the actuator 38a to switch the sensor 38 into an on-state. When the take-up shaft 31 is not loaded in position, the sensor 38 maintains an off-state.

A controller 39 is connected to the sensor 38 such that an automatic paper threading operation instruction is outputted by the controller 39 in response to an on-signal from the sensor 38 so as to perform automatic paper threading. Automatic paper threading is inhibited in any other instance.

Figure 3A:
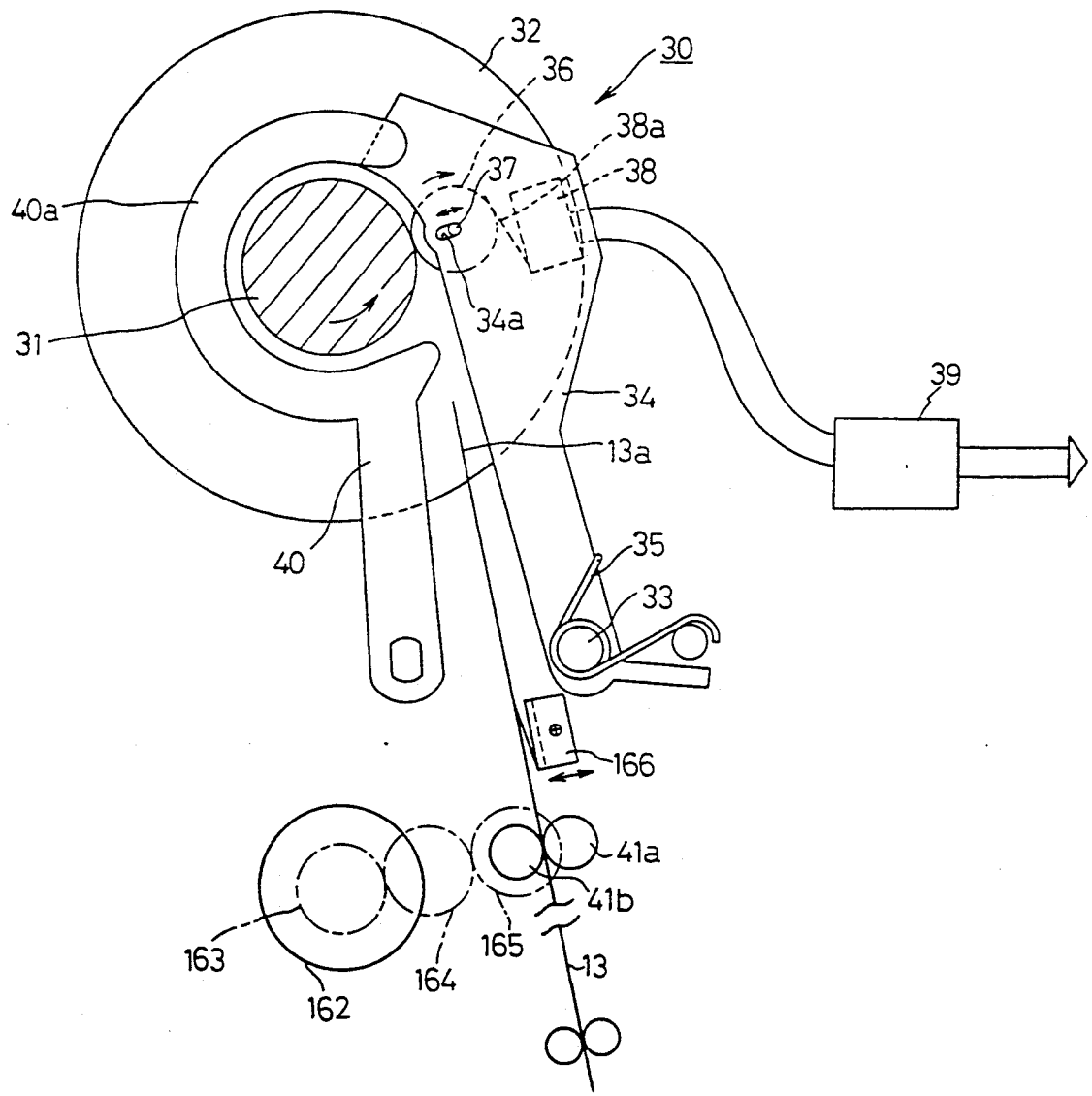
FIG. 3A is a side elevational sectional view of an automatic winding mechanism according to a second embodiment of the present invention.
Figure 3B:
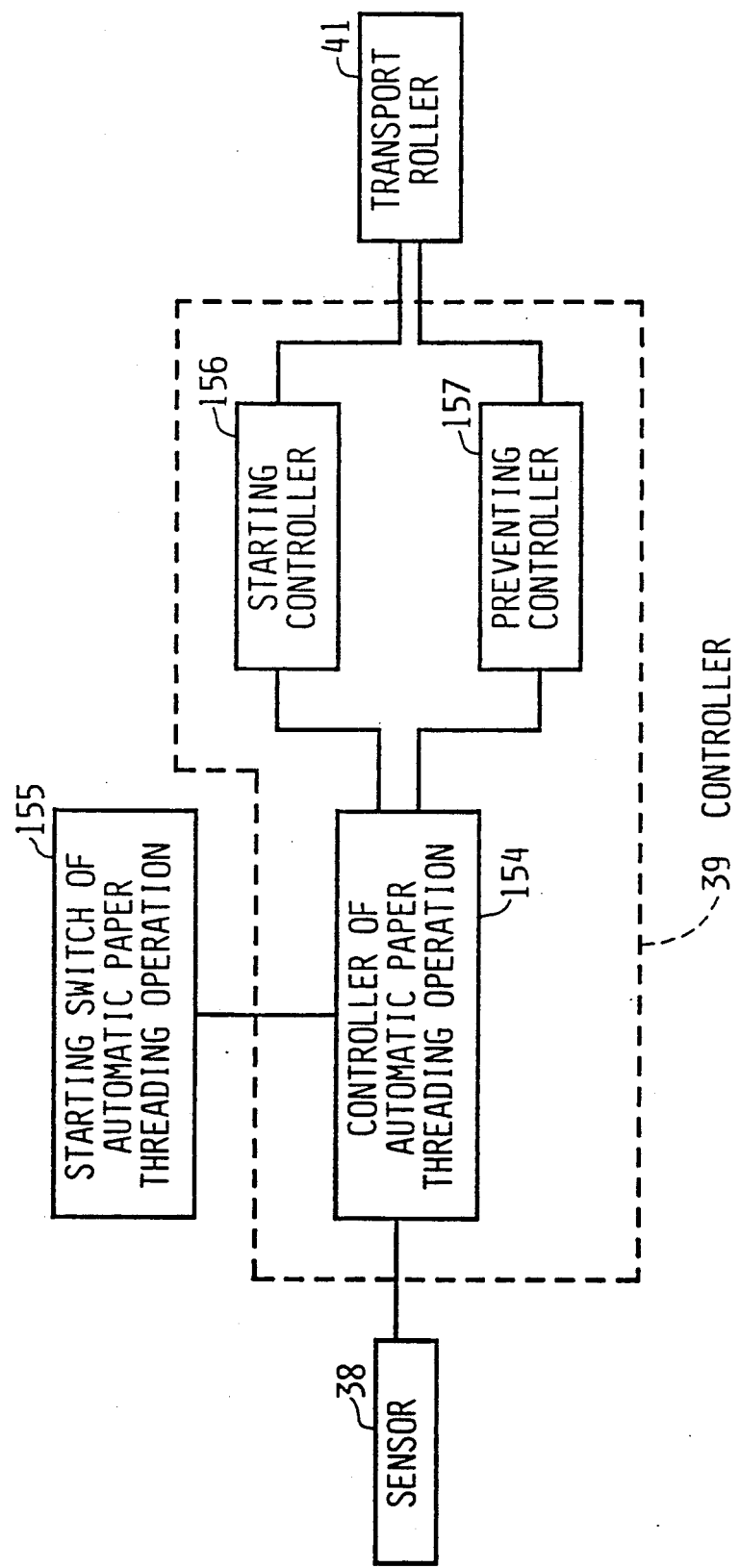
FIG. 3B is a block diagram of the automatic winding mechanism according to the second embodiment shown in FIG. 3A.
Figure 3C:
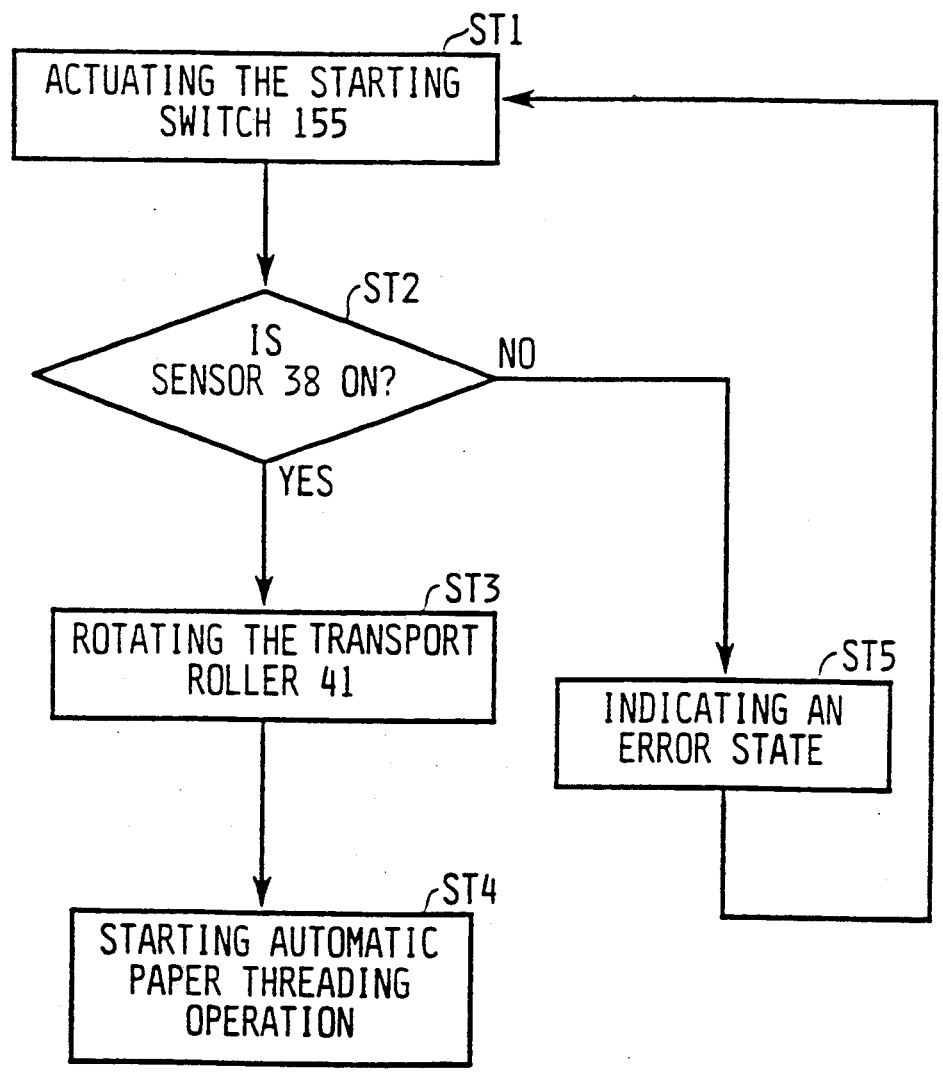
FIG. 3C is a flow chart of an operation of automatic paper threading according to the second embodiment.

FIG. 3B shows the controller 39 to be constructed from an automatic paper threading operation controller 154, a starting controller 156 and a preventing controller 157. The sensor 38 and a starting switch 155 are connected to the controller 154. One terminal end of the starting controller 156 is connected to the controller 154, the other terminal end thereof is connected to the transport rollers 41a, 41b. One terminal end of the preventing controller 157 is connected to the controller 154, the other terminal end thereof is connected to the transport rollers 41a, 41b. The operation of automatic paper threading is explained based on FIG. 3C. In step 1 (ST1), the starting switch 155 is actuated. Next, in step 2 (ST 2), the controller 154 determines whether or not the sensor 38 is ON. If the sensor 38 is ON, the controller 156 starts to rotate the transport rollers 41a, 41b (ST3). Thus, automatic paper threading operation is started (ST 4). If sensor 38 is not ON in ST2, an error state indicating that the take-up shaft 31 is not loaded in position is indicated by a lamp, a buzzer etc. (not shown) (ST5). After ST 5, judgment flow is backed to ST1.

Figure 4:
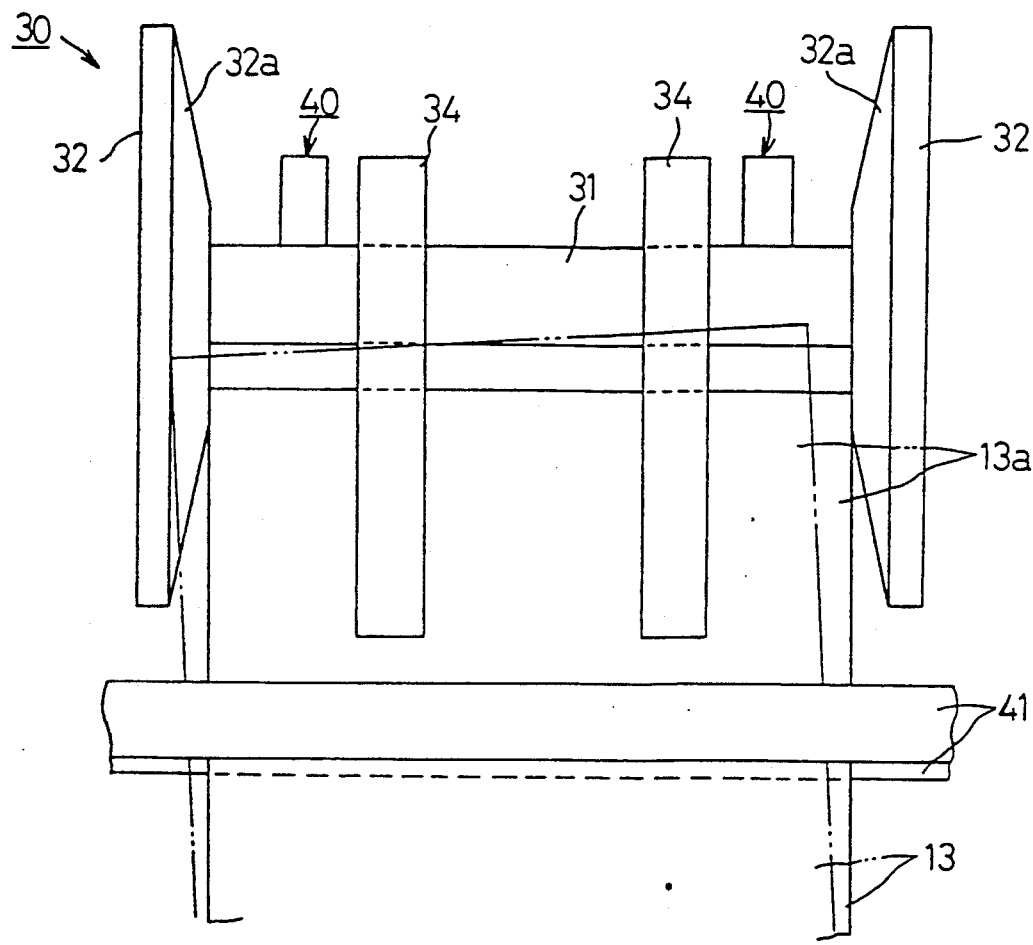
FIG. 4 is an enlarged plan view of the automatic winding mechanism shown in FIG. 3A.

As shown in FIG. 4, a pair of winding guides 40 are disposed alongside the holding arms 34 on the opposite side of the holding arms 34 with respect to the take-up shaft 31. Each of the winding guides 40 has a semicircular introducing portion 40a formed at an upper portion thereof. The winding guides 40 function to guide, upon automatic paper threading of the continuous sheet 13, a leading end portion, or leader portion, 13a of the continuous sheet 13 and to curve the leader portion 13a arcuately along the introducing portions 40a thereof until the leader portion 13a is wound around the take-up shaft 31. Once the leader portion 13a of the continuous sheet 13 is wound around the take-up shaft 31, the winding guides 40 are rocked outwardly so that they do not form an obstruction to winding of a succeeding portion of the continuous sheet 13.

In the winding device 30, a pair of winding flanges 32 are mounted at the opposite end portions of the take-up shaft 31 for guiding and properly arranging the opposite side portions of the continuous sheet 13 wound on the take-up shaft 31. Each of the winding flanges 32 is formed as a disk having an axial inner end face 32a tapered inwardly toward the axis of the take-up shaft 31. If the leader portion 13a of the continuous sheet 13 is displaced laterally during transportation thereof, a side edge of the continuous sheet 13 will engage with the inner end tapered face 32a of the mounting flange 32. Consequently, when a nip of the continuous sheet 13 by a pair of transport rollers 41a, 41b is cancelled as described hereinbelow, the continuous sheet 13 is moved back to the center of the take-up shaft 31 under the guidance of the tapered face 32a of the mounting flange 32 due to the rigidity of the continuous sheet 13. As a result, the continuous sheet 13 is centered with respect to the take-up shaft 31.

A pair of transport rollers 41a, 41b are disposed on the upstream side of the take-up shaft 31 for contacting with each other to hold the continuous sheet 13 therebetween and to transport the continuous sheet 13. A nip cancelling mechanism 42 is provided for the transport rollers 41a, 41b. The nip cancelling mechanism 42 moves at least one of the transport rollers 41a away from the other transport roller 41b to cancel the mutually contacting condition of the transport rollers 41a, 41b thereby temporarily cancelling the nip of the continuous sheet 13 by the transport rollers 41a, 41b.

Figure 5:
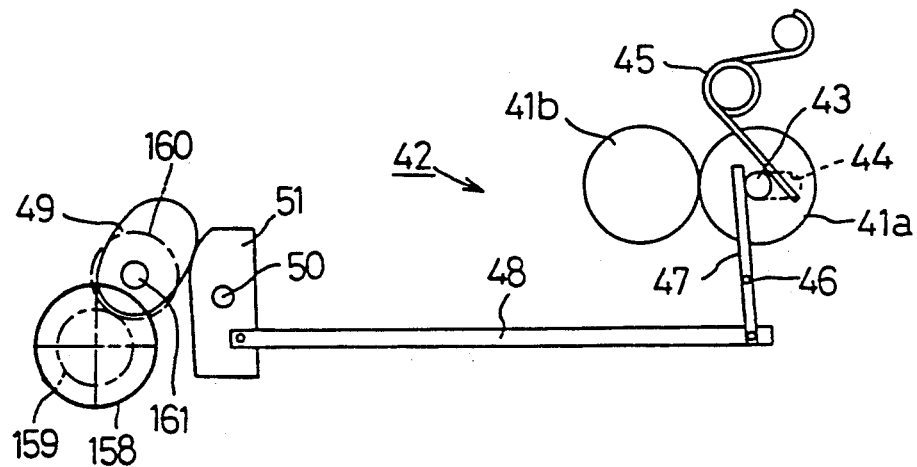
FIG. 5 is a diagrammatic illustration showing a nip cancelling mechanism usable in the automatic winding mechanism shown in FIG. 3A.

An example of such nip cancelling mechanism 42 is shown in FIG. 5. Referring to FIG. 5, one of the transport rollers 41a is supported for horizontal movement by a rotary shaft 43 thereof fitted in a horizontally extending elongated hole 44 and is normally biased toward the other transport roller 41b by means of a coil spring 45 so that the two transport rollers 41a, 41b are normally held in pressure contact with each other. A rockable arm 47 is supported at a substantially mid portion thereof for pivotal motion by means of a pivot shaft 46 and has an end held in contact with the rotary shaft 43 of the movable transport roller 41a. The rockable arm 47 is pivotally connected at the other end thereof to an end of a connecting rod 48 which is pivotally connected at the other end thereof to a lower end of a follower 51. The follower 51 is supported for rocking motion around a pivot shaft 50 and held in engagement at an upper side edge thereof with a cam 49 so that, when the cam 49 is rotated, by a step motor 158 through a drive gear 159 fixed on a rotor thereof and a driven gear 160 fixed on a cam shaft 161, the follower 51 may be rocked around the pivot shaft 50. Consequently, the rockable arm 47 is rocked by way of the connecting rod 48 to move the movable transport roller 41a away from the other fixed transport roller 41b to cancel a nip of the continuous sheet 13 by the transport rollers 41a, 41b. The nip cancelling mechanism need not have the specific construction as described above but may also include, for example, a solenoid or a motor.

The cancelling of a nip by rotation of the cam 49 is performed at an instant when the leader portion 13a of the continuous sheet 3 reaches the take-up shaft 31. Such instant can be determined, for example, by a counting operation of an encoder of an encoder motor 162 (See FIG. 3A) provided for driving the transport rollers 41a, 41b through gears 163, 164 and 165. Such instant may otherwise be determined by means of a microswitch 166 which contacts an upper end edge of the continuous sheet 13 or an optical sensor (not shown) for detecting an upper end edge of the continuous sheet 13.

In operation, the take-up shaft 31 around which a used continuous sheet 13 is wound is removed and a new take-up shaft 31 is loaded in position into the paper winding device 30. If loading of a new take-up shaft 31 is forgotten, the sensor 38 remains in its off-state, and consequently, no automatic paper threading operation will take place. Thus, only when a new take-up shaft 31 is loaded in position, the roller 36 is engaged with and retracted by the new take-up shaft 31 so that the sensor 38 develops an on-state signal, which enables the paper winding device 30 to make an automatic paper threading operation by way of the controller 39. Upon such automatic paper threading, the transport rollers 41a, 41b are rotated so that the continuous sheet 13 is introduced toward the take-up shaft 31. At this time, the transport rollers 41a, 41b remain in a nip condition. At an instant at which the leader portion 13a of the continuous sheet 13 reaches the take-up shaft 31, detected from a count value of the encoder of the encoder motor 162, the cam 49 of the nip cancelling device 42 is rotated to cancel the nip condition of the continuous sheet 13 by the transport rollers 41a, 41b. If there is some lateral displacement in the leader portion 13a of the continuous sheet 13, for example, as indicated by alternating long and two short dash lines in FIG. 4, a side edge of the leader portion 13a of the continuous sheet 13 will contact the inner end tapered face 32a of one of the flanges 32 mounted on the opposite end portions of the take-up shaft 31 toward which the continuous sheet 13 is displaced. Consequently, the leader portion 13a of the continuous sheet 13 is moved to the center of the take-up shaft 31 along the inner end tapered face 32a of the flange 32 due to the rigidity of the continuous sheet 13 on the transport route. As a result, the leader portion 13a of the continuous sheet 13 is controlled to be in the regular position, as indicated by solid lines in FIG. 4, thereby centering the continuous sheet 13 with respect to the take-up shaft 31.

As the automatic paper threading operation further proceeds, the leader portion 13a of the continuous sheet 13 is introduced between the take-up shaft 31 and the roller 36 and held on the take-up shaft 31 by the pressing force of the roller 36. The leader portion 13a of the continuous sheet 13 is then curved arcuately along the introducing portion 40a of the winding guide 40 and finally wound around the take-up shaft 31, thereby completing the automatic paper threading operation. The winding guide 40 is then rocked outwardly, and as the take-up shaft 31 is rotated, the continuous sheet 13, after being used, is successively wound around the take-up shaft 31 while it is acted upon by a pressing force from the roller 36 originating from the resilient force of the torsion spring 35.

Referring now to FIG. 6, there is shown an image forming device in the form of a color copying machine in which an automatic winding mechanism according to the present invention is incorporated. The copying machine shown includes a copying machine body 101, a glass original table 102 for receiving an original thereon, and a cover 103 for removably covering the glass original table 102. The glass original table 102 and the cover 103 are disposed for leftward and rightward movement in FIG. 6 on a top plate 104 mounted at the top of the copying machine body 101. Located below the glass original table 102 is a light source 105 which includes a halogen lamp 105a which extends in a direction perpendicular to the direction of movement of the glass original table 102 for irradiating light upon an original placed on the glass original table 102, and reflecting mirror members 105b for reflecting light from the halogen lamp 105a toward the glass original table 102. While the light source 105 is emitting light, the glass original table 102 is moved leftwardly and rightwardly so that light from the light source 105 is irradiated upon the entire area of the original.

An exposure table 110 is disposed substantially at the center of the inside of the copying machine body 101. A filter 106 and a condenser lens 107 for adjusting the tone of a copy image are interposed between the light source 105 and the exposure table 110. A pair of reflecting mirrors 108 and 109 for adjusting the length of a light path for a focusing operation are disposed for adjustment between the condenser lens 107 and the exposure table 110. Thus, light irradiated upon and reflected from the original is introduced to the exposure table 110 by way of the filter 106, condenser lens 107 and reflecting mirrors 108 and 109.

A continuous microcapsule carrying sheet or continuous sheet 111 of the cartridge type is disposed at an upper location inside of the copying machine body 101 and removably supported in a wound condition on a support shaft 112. The microcapsule carrying sheet 111 carries thereon a large number of microcapsules containing dyestuffs for color copying therein. A paper winding device 130 is disposed alongside the support shaft 112 and includes a take-up shaft 131 for winding the microcapsule sheet 111 after use thereon. After the microcapsule sheet 111 is drawn out from the cartridge by rotation of a plurality of feed rollers 114a, 114b and 114c, it is wound around the take-up shaft 131 of the paper winding device 130. Winding device 130 includes one or more rockable holding arms 134 pivoted on a pivot shaft 133, one or more rollers 136 being supported therein and one or more rockable winding guides 140 having an introducing portion 140a. In the meantime, a portion of the microcapsule sheet 11 which passes below the exposure table 110 is exposed to light so that the latent image is formed thereon.

A cassette 117 is removably mounted on the copying machine body 101 below the exposure table 110 and accommodates therein developing paper 116 in the form of sheets of a fixed size. A pressure developing device 113 including a pair of pressure rollers 113a and 113b is disposed between the exposure table 110 and the take-up shaft 131. The microcapsule sheet 111 and a developing paper sheet 116 are contacted under pressure with each other within the pressure developing device 113 so that a color image corresponding to the latent image on the microcapsule sheet 11 is formed on the developing paper sheet 116.

The developing paper sheet 116 is formed, for example, by forming a heat soluble surface resin layer on a layer of a developer applied to a base material The base material may be paper having a small heat capacity or polyethylene terephthalate having a large heat capacity Cassette 117 has a projection (not shown) from which a size of the developing paper sheets 116 accommodated therein is determined, and a determining device (not shown) for determining the size, etc., of the projection to determine the size of the developing paper sheets 116 provided in the copying machine body 101.

A sucking device 118 is provided above the cassette 117, and a plurality of feed rollers 119a, 119b, 119c and 119d for feeding developing paper sheet 116 toward the pressure developing device 113 and a stopper 119e are provided along a paper guide between the cassette 117 and the pressure developing device 113. An exfoliating roller 114d for exfoliating a developing paper sheet 116 from the microcapsule sheet 111 is provided on the forwarding side of the pressure developing device 113. A sheet heating device 120 for thermally fixing an image formed on a developing paper sheet 116 is disposed on the developing paper sheet forwarding side of the exfoliating roller 114d. The sheet heating device 120 includes a roller 120a and is located such that a developing paper sheet 116, after formation of a color image thereon and discharged from the sheet heating device 120, may be accommodated into a tray 121.

Thus, when a color copy is to be produced on the copying machine described above, at first a start button (not shown) will be depressed. Consequently, the glass original table 102 is moved rightwardly to its right limit position so that the left end of an original placed on the glass original table 102 comes to a position at which it opposes the halogen lamp 105a of the light source 105. The halogen lamp 105a is then lighted. In this condition, the glass original table 102 is moved leftwardly back to its left limit position at which irradiation of light upon the original comes to an end.

During such irradiation of light, the microcapsule sheet 111 is moved on the exposure table 110 to the winding side at the same speed as the glass original table 102. Consequently, a latent image of the original is formed on the microcapsule sheet 11 with reflected light from the original. Meanwhile, a developing paper sheet 115 is attracted by the sucking device 118 and fed from the cassette 117 toward the pressure developing device 113 in synchronism with the leftward returning movement of the glass original table 102, and an exposed portion of the microcapsule sheet 11 is contacted under pressure with the developing paper sheet 116 to form a color image on the developing sheet 116.

The developing paper sheet 116 is then introduced by the feed roller 114c, etc., to the sheet heating device 120 in which the image is fixed to the developing paper sheet 116 by heat in the inside of the sheet heating device 120. After such fixation of the image, the developing paper sheet 116 is discharged into the tray 121. Meanwhile, the microcapsule sheet 111 after use is wound around the take-up shaft 131 of the paper winding device 130 by cooperating motion between the roller 136, supported in the rockable holding arm 134 pivoted on the pivot shaft 133, and the introducing portion 140a of the winding guide 140.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein. For example, while automatic winding of a leader portion of a sheet for an image forming device is described as an example in the embodiments described above, the present invention can be applied to an automatic winding mechanism for record paper in the form of a roll, for example, for a facsimile machine or a printer.

What is claimed is:

1. An automatic winding mechanism for a continuous sheet comprising:
    a rotatable winding shaft for winding a continuous sheet thereon;
    feeding means for feeding a continuous sheet toward said winding shaft;
    first guide means for guiding a leader portion of a continuous sheet along a peripheral surface of said winding shaft, said first guide means supporting a guide roller for rotation and for movement from a first position to a second position in a radial direction with respect to a radius of said winding shaft, said first guide means being movable radially toward and away from said winding shaft and having a resilient member at one end thereof for biasing said first guide means toward said winding shaft wherein said guide roller is urged to contact a peripheral surface of said winding shaft by said resilient member;
    second guide means including a U-shaped guide portion for partially surrounding said winding shaft;
    sensor means for sensing a movement of said guide roller in said radial direction of said winding shaft; and
    control means for controlling said feeding means so as to start feeding of a continuous sheet when movement of said guide roller from said first position to said second position is sensed by said sensor means and to prevent feeding of a continuous sheet when movement of said guide roller from said first position to said second position is not sensed by said sensor means so that said feeding means is not started when said winding shaft is not mounted.

2. The automatic winding mechanism according to claim 1, wherein said first guide means has an elongated hole along said radial direction and wherein said guide roller moves in said elongated hole.

3. The automatic winding mechanism according to claim 1, wherein said sensor means comprises a microswitch having an actuator member contacting with said guide roller and wherein said microswitch senses movement of said guide roller from said first position to said second position in said radial direction by said actuator.

4. An automatic winding mechanism for a continuous sheet comprising:
    a rotatable winding shaft for winding a continuous sheet thereon, said winding shaft having a pair of flanges tapered toward a center of said winding shaft, said flanges being spaced from each other along an axial direction of said winding shaft;
    feeding means for feeding a continuous sheet, said feeding means including a pair of feed rollers for feeding a continuous sheet toward said winding shaft and nipping a continuous sheet therebetween;
    sensor means for sensing that a leader portion of a continuous sheet has arrived at a position near said winding shaft; and
    nip canceling means for canceling a nip of a continuous sheet by said feed rollers when said sensor means senses that a leader portion has arrived near said winding shaft so that the leader portion of the continuous sheet is moved to a center of said winding shaft.

5. The automatic winding mechanism according to claim 4, wherein said sensor means is positioned between said feed rollers and said winding shaft.

6. The automatic winding mechanism according to claim 4, wherein at least one of said feed rollers can be moved away from the other of said pair of feed rollers, said nip cancelling means moving said at least one feed roller away from said other feed roller.

7. A copy machine for using a continuous sheet for making an image of a manuscript on a copy sheet comprising:
    supplying means for supplying a continuous sheet;
    automatic winding means for winding a continuous sheet supplied from said supplying means;
    wherein said automatic winding means comprises:
    a rotatable winding shaft for winding a continuous sheet thereon, said winding shaft having a pair of flanges spaced from each other along an axial direction of said winding shaft and being tapered toward a center of said winding shaft;
    feeding means for feeding a continuous sheet, said feeding means including a pair of feed rollers for feeding a continuous sheet toward said winding shaft and nipping a continuous sheet therebetween;
    first guide means for guiding a leading portion of a continuous sheet along a peripheral surface of said winding shaft, said first guide means supporting a guide roller for rotation and for movement from a first position to a second position in a radial direction with respect to said winding shaft;
    second guide means including a U-shaped guide portion for partially surrounding said winding shaft;
    first sensor means for sensing a movement of said guide roller from said first position to said second position in said radial direction of said winding shaft;
    second sensor means for sensing that a leader portion of a continuous sheet has arrived at a position near said winding shaft; and
    nip canceling means for canceling a nip of a continuous sheet by said feed rollers when said sensor means senses that a leader portion has arrived near said winding shaft so that the leader portion of the continuous sheet is moved to a center of said winding shaft.

8. The copying machine according to claim 25, further comprising:

control means for controlling said feeding means, said control means preventing said feeding means from operating when said first sensor means, does not sense said movement of said guide roller from said first position to said second position.

9. A copying machine for using a continuous sheet for making an image of a manuscript on a copy sheet comprising:

supply means for supplying a continuous sheet;

automatic winding means for winding a continuous sheet supplied from said supply means;

wherein said automatic winding means comprises:

mounting means for rotatably mounting a winding shaft for winding a continuous sheet thereon;

feeding means for feeding a continuous sheet toward a winding shaft when mounted on said mounting means;

guide means for guiding a leader portion of a continuous sheet along a peripheral surface of said winding shaft when mounted on said mounting means;

sensor means for sensing whether or not a winding shaft is mounted on said mounting means; and control means for controlling said feeding means, said control means preventing said feeding means from operating when said sensor means senses that a winding shaft is not mounted.

10. The copying machine according to claim 9, wherein said guide means includes:

first guide means for guiding a leader portion of a continuous sheet along a peripheral surface of a winding shaft when mounted on said mounting means, said first guide means supporting a guide roller for rotation and for movement from a first position to a second position in a radial direction with respect to a radius of said winding shaft and second guide means including a U-shaped guide portion for partially surrounding said winding shaft; and wherein said sensor means senses whether or not a winding shaft is mounted by sensing a movement of said guide roller from said first position to said second position in said radial direction of said winding shaft.

11. The copying machine according to claim 10, wherein said first guide means has an elongated hole along said radial direction and wherein said guide roller moves in said elongated hole.

12. The copying machine according to claim 10, wherein said sensor means comprises a microswitch having an actuator member contacting with said guide roller and wherein said microswitch senses movement of said guide roller in said radial direction by said actuator.

13. The copying machine according to claim 10, wherein said first guide means is movable radially toward and away from said winding shaft and has a resilient member at one end thereof for biasing said first guide means towards said winding shaft wherein said guide roller is urged to contact a peripheral surface of said winding shaft by said resilient member.

* * * * *

UNITED STATES PATENT AND TRADEMARK OFFICE
CERTIFICATE OF CORRECTION

PATENT NO. : 5,112,002
DATED : May 12, 1992
INVENTOR(S) : Eiji Shibata and Motoshi Ohno It is certified that error appears in the above-indentified patent and that said Letters Patent is hereby corrected as shown below:

On the title page, item [75] Inventors: change "Eiji Shibata, Mototsugu Ong, both of Nagoya, Japan" to --Eiji Shibata, Motoshi Ohno, both of Nagoya, Japan--.

Signed and Sealed this

Twentieth Day of July, 1993

Attest:

MICHAEL K. KIRK

Attesting Officer    Acting Commissioner of Patents and Trademarks